T. B. JEFFERY.
VEHICLE WHEEL.
APPLICATION FILED JAN. 15, 1906.
919,358.
Patented Apr. 27, 1909.
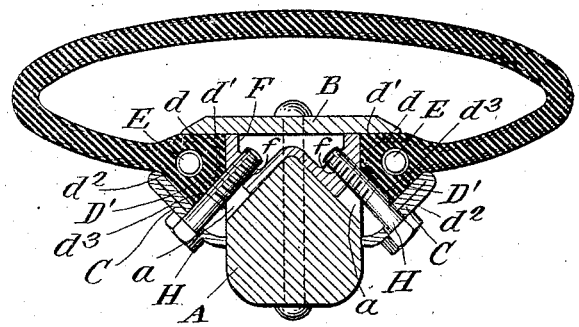
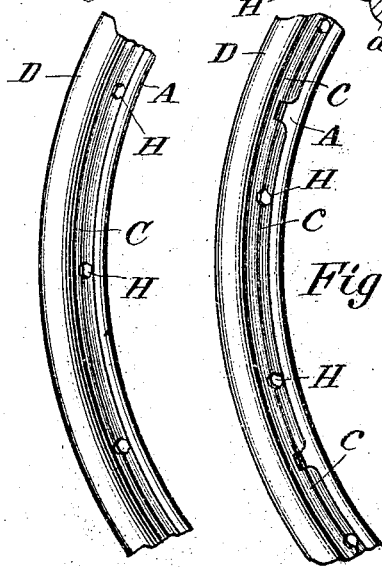
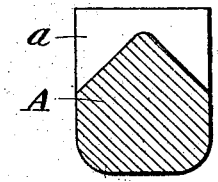
Witnesses:
Walter Eyers
J S Abbott
Inventor:
Thos. B. Jeffery
by Burton & Burton
his attys

UNITED STATES PATENT OFFICE.

THOMAS B. JEFFERY, OF KENOSHA, WISCONSIN.

VEHICLE-WHEEL.

No. 919,358. Specification of Letters Patent. Patented April 27, 1909.

Application filed January 15, 1906. Serial No. 296,006.

*To all whom it may concern:*

Be it known that I, THOMAS B. JEFFERY, a citizen of the United States, residing at Kenosha, in the county of Kenosha and State of Wisconsin, have invented new and useful Improvements in Vehicle-Wheels, of which the following is a specification, reference being had to the accompanying drawings, forming a part thereof.

The purpose of this invention is to provide an improved construction of vehicle wheel, chiefly in respect to the means of holding the tire to the felly.

It consists in the features of construction set out in the claims.

In the drawings:—Figure 1 is a transverse section of the felly and tire of a wheel embodying one form of this invention. Fig. 2 is a side elevation of a segment of such wheel. Fig. 3 is a view similar to Fig. 2, showing a subdivided clamp or guard for the form of felly shown in Fig. 1. Fig. 4 is a view similar to Fig. 1 showing a second modification. Fig. 5 is a detail side elevation of a segment of the wheel having the side guards of the form in cross section shown in Fig. 4 but made up of several segmental sections. Fig. 6 is a section of a felly alone, taken in the same plane as the section in Fig. 1.

The felly comprises a main body portion, A, which may be understood to be of wood (although the invention is not necessarily limited in respect to the material of this element), a metal rim, B, encompassing the body, A, and overhanging the same at both margins, and lateral guards or tire retainers, C, C, mounted at opposite sides of the body, A, as more particularly hereinafter described. The tire sheath, D, is of any suitable material and construction for inclosing an inflatable or other form of tire, designed, however, in either case preferably to be comparatively flat when filled or inflated, and any means or mode of construction adapted to restrict it to such shape may be adopted. For the purpose of securely attaching the tire to the felly the sheath, D, is formed with heavy reinforced marginal enlargements, D', D', which, when the sheath is made in the well-known manner—consisting of layers of fabric embedded in and saturated with rubber—are formed by folding the fabric about an inclosed reinforcing, endless, non-extensible cord, cable or wire, E. These marginal enlargements, D', are in transverse section, of form which is substantially dovetailed,—that is, expanding outwardly from the thickness of the sheath to the edge faces, $d$, of the enlargements which seat against the opposite lateral surfaces of the body, A, of the felly. Said edge face, $d$, is at right angles to the inner face, $d'$, of the enlargement, and the outer face, $d^2$, diverges from the latter at an angle of about 45 degrees, so that when the inner face, $d'$, is directly transverse to the plane of the wheel, as when the tire sheath is clamped in place with the edge faces, $d$, $d$, bound against the opposite lateral surfaces of the body, A, of the felly— the outer face, $d^2$, faces away from said plane of the wheel obliquely toward the axis of the latter. Suitable dovetail spaces for engaging the dovetailed enlargements, D', are formed between the overhanging marginal portions of the endless metal rim, B, which circumferentially encompasses the body, A, of the felly within the tire sheath cavity having its inner face toward the wheel axis at right angles to the plane of the wheel, and the tire retainers or clamps, C, C, which are preferably also annular and endless, and as to their clamping faces. frusto-conical with a conical slope of about 45 degrees, as necessary in order to seat against the faces, $d^2$, of the marginal enlargements, D', which slope at that angle to the plane of the wheel, as indicated. Twin nuts or saddle nuts, F, striding the body of the felly and lodged in notches, $a$, formed in the periphery of the latter to accommodate them, have at right-angles to the inner faces of the guards, C, C, threaded apertures, $f$, $f$, for the bolts, H, which take through said guards or retainers, C, C, and through notches, $d^3$, in the lower edges of the enlargements, D', for clamping said enlargements both against the lateral faces of the body, A, and also against the inner face of the overhanging marginal portions of the rim, B,—that is, into said dovetail spaces mentioned. Said bolts, H, having their heads bearing against the outer inclined face of the guard, thus draw directly against the outer faces, $d^2$, of the enlargements, D', for forcing said enlargements into the right angles between the lateral faces of the body, A, and the overhanging margins of the rim, B.

In Figs. 4 and 5 there is shown another modification consisting in forming the parts which bound the cavities in which the marginal enlargements of the tire sheath are engaged, with their inner faces corrugated or ribbed so as to give the cavities double-dovetailed form and making said marginal enlargements either by construction or by their compression between the bounding walls of said cavities of corresponding form. In this form, the rim, B, has its marginal portions, B$^a$, B$^a$, formed with two corrugations or ribs, b$^2$, b$^2$, and the guards or retainers—which in this form are designated by reference character, C$^b$—have their faces which are opposed to the overhanging ribbed or corrugated margins, B$^a$, correspondingly provided with two corrugations or ribs c$^2$, c$^2$, so that the cavity bounded between these two corrugated walls is in the form of one dovetail succeeding another, whereby there are afforded two shoulders to resist any strain tending to disengage the correspondingly shaped marginal enlargements, D$^a$, of the tire sheath.

In all the forms shown, the guards may be either each completely annular or composed of a multiplicity of sections. In Figs. 3 and 5, the two forms of guard represented in Figs. 1 and 4, respectively, are shown subdivided in short sections, c, and c$^b$. The unitary annular guard does not present materially different appearance in the two forms, Figs. 1 and 4, and the guard as shown in Fig. 2 may be taken equally as representing in that view the annular guard of the form shown in Fig. 4.

I claim:—

1. A vehicle wheel comprising a felly formed with dovetail cavities at opposite sides, the inner wall of each cavity being fixed with respect to the body of the felly; lateral guards mounted on the body portion forming the outer wall of said cavities respectively; nuts seated in the felly at the inner side of said cavities, in combination with a tire sheath having marginal enlargements adapted to be engaged in said dovetail cavities, and bolts taking through said outer guards across said cavities into said nuts for clamping the enlargements between the inner and outer wall of the dovetail cavities.

2. In a vehicle wheel comprising a felly having a body portion and a peripheral encompassing rim provided with margins overhanging the body portion at both sides; lateral guards mounted on the body portion having their inner faces sloped divergently from each other and converging toward the inner surface of said overhanging margins of the rim, in combination with a tire sheath having marginal enlargements dovetailed in cross-section adapted to be engaged between said overhanging marginal portions of the rim and the guards at the respective sides of the body; nuts lodged in the felly under said rim and bolts taking through the guards and said marginal enlargements of the sheath into said nuts for clamping the enlargements between the converging faces of the rim and guards.

3. In a vehicle wheel comprising a felly having a body portion and a peripheral encompassing rim having margins overhanging the body portion at both sides; saddle nuts striding the body portion of the felly under the rim having threaded bolt apertures at opposite sides of the body; lateral guards mounted on the body portion having their faces converging toward the respective overhanging margins of the rim and forming dovetail cavities at opposite sides of the body, in combination with a tire sheath having marginal enlargements adapted to be engaged in such cavities, and bolts taking through the guards across the cavities into the apertures of the nuts.

In testimony whereof, I have hereunto set my hand at Kenosha, Wis., this 29 day of December, 1905.

THOS. B. JEFFERY.

Witnesses:
JERRY W. DE CON,
GEO. H. EDDY.